(12) United States Patent
Emborg

(10) Patent No.: US 11,566,435 B2
(45) Date of Patent: Jan. 31, 2023

(54) PANEL FOR A BUILDING STRUCTURE HAVING A PREDEFINED CURVATURE AND A METHOD OF MANUFACTURING SUCH PANEL

(71) Applicant: Rockwool International A/S, Hedehusene (DK)

(72) Inventor: Michaeel Emborg, Kirke Saaby (DK)

(73) Assignee: ROCKWOOL INTERNATIONAL A/S, Hedehusene (DK)

( * ) Notice: Subject to any disclaimer, the term of this patent is extended or adjusted under 35 U.S.C. 154(b) by 0 days.

(21) Appl. No.: 16/962,481

(22) PCT Filed: Jan. 15, 2019

(86) PCT No.: PCT/EP2019/050938
§ 371 (c)(1),
(2) Date: Jul. 15, 2020

(87) PCT Pub. No.: WO2019/141678
PCT Pub. Date: Jul. 25, 2019

(65) Prior Publication Data
US 2021/0079674 A1     Mar. 18, 2021

(30) Foreign Application Priority Data
Jan. 19, 2018    (EP) .................... 18152526

(51) Int. Cl.
*E04H 1/12* (2006.01)
*E04B 1/80* (2006.01)
(Continued)

(52) U.S. Cl.
CPC ............. *E04H 1/1205* (2013.01); *E04B 1/80* (2013.01); *E04C 2/16* (2013.01);
(Continued)

(58) Field of Classification Search
CPC ..... E04H 1/1205; E04B 1/80; E04B 1/34321; E04B 2001/3276; B32B 2307/304; E04C 2/16; E04C 2/328
See application file for complete search history.

(56) References Cited

U.S. PATENT DOCUMENTS 2,180,373 A * 11/1939 Sibley .................... F16L 59/08
52/407.1
2,351,209 A *  6/1944 Hobbs ................... E04B 1/3205
52/274
(Continued)

FOREIGN PATENT DOCUMENTS

CN          1212228 C    7/2005
DE    102008035937 A1    2/2010
(Continued)

*Primary Examiner* — Gisele D Ford
(74) *Attorney, Agent, or Firm* — Dinsmore & Shohl LLP

(57) ABSTRACT

A panel for a building structure has a predefined curvature. The panel has a generally rectangular shape with a curvature, such that the panel has a convex outer surface and a concave inner surface with a set of side edge regions and a set of end edge regions. The panel is at least one mineral wool fibre slab with a plurality of first strips adhered to the outer surface and a plurality of second strips adhered to the inner surface.

22 Claims, 5 Drawing Sheets

(51) Int. Cl.
*E04C 2/16* (2006.01)
*E04B 1/343* (2006.01)
*E04B 1/32* (2006.01)
*E04C 2/32* (2006.01)
*E04C 2/08* (2006.01)

(52) U.S. Cl.
CPC ..... *B32B 2307/304* (2013.01); *E04B 1/34321* (2013.01); *E04B 2001/3276* (2013.01); *E04B 2001/3288* (2013.01); *E04C 2/08* (2013.01); *E04C 2/328* (2013.01)

(56) References Cited

U.S. PATENT DOCUMENTS

| | | | |
|---|---|---|---|
| 4,094,110 A | | 6/1978 | Dickens et al. |
| 4,625,472 A | * | 12/1986 | Busick ................. E04B 1/3211 52/259 |
| 4,788,803 A | * | 12/1988 | Seitz .................... E04B 1/3211 52/248 |
| 8,615,934 B1 | | 12/2013 | Webb et al. |
| 9,371,641 B2 | * | 6/2016 | Christensen ............. E04B 1/32 |
| 2009/0032487 A1 | | 2/2009 | Rekstad |
| 2009/0324871 A1 | * | 12/2009 | Henn ..................... E04B 1/803 428/69 |

FOREIGN PATENT DOCUMENTS

| | | |
|---|---|---|
| EP | 0091534 A1 | 10/1983 |
| GB | 1178261 A | 1/1970 |
| WO | 02092342 A1 | 11/2002 |
| WO | 2013064150 A1 | 5/2013 |
| WO | 2017167634 A1 | 10/2017 |

\* cited by examiner

PANEL FOR A BUILDING STRUCTURE HAVING A PREDEFINED CURVATURE AND A METHOD OF MANUFACTURING SUCH PANEL

CROSS-REFERENCE TO RELATED APPLICATIONS

This application is the U.S. national stage of PCT/EP2019/050938 filed Jan. 15, 2019, which claims priority of European patent application 18152526.2 filed Jan. 19, 2018 both of which are hereby incorporated by reference in their entirety.

FIELD OF THE INVENTION

The present invention relates to a panel for a building structure having a predefined curvature, said panel having a generally rectangular shape with a curvature, such that the panel has a convex outer surface and a concave inner surface with a set of side edge regions and a set of end edge regions. The invention also relates to a method of manufacturing such panel.

BACKGROUND OF THE INVENTION

Building structures, such as temporary building structures, that are simple and fast to erect by using suitable panels are well known from e.g. WO 2013/064150.

In WO 2013/064150, a shelter construction is disclosed which comprises premade shells, i.e. preformed panels of e.g. polyurethane or polystyrene concrete for providing insulation. This is advantageous over the shelter constructions disclosed in GB 1,178,261 where the shells are made of glass fibre. In U.S. Pat. No. 8,615,934 another example of a panelised portable shelter is known.

Such shelters are building structures of a portable kind are used in addition or instead of tents to provide immediate shelter for refugees, victims of a natural disaster or the like where people are made home-less and are therefore in need for accommodation. A requirement for such shelters is therefore that it is easy to transport to a sometimes remote geographical area in which it is needed and that it is easy to erect. Tents have been widely used as a tent fulfils these criteria, but a drawback for tents is that there is no thermal insulation. A further drawback is the relatively short life time of tents.

The building structure could also be a low cost or semi-permanent building, i.e. in regions with poverty or in situations where the building is needed for a limited number of years, e.g. for housing children or as a hunting lodge.

For a building structure, such as a shelter of the above-identified kind, it is desirable to obtain a building panel with good insulation properties besides the above-mentioned properties. The panels should also allow for construction that facilitates a quick, simple and easy construction of such a shelter. For meeting this requirement, a shelter panel is disclosed in WO 2017/167634 with a sandwich of mineral wool materials with a low density core sandwiched between high density layers on each side and with the low density core extending beyond the side edges so that a tight assembly between panels can be provided.

SUMMARY OF THE INVENTION

However, in order to ensure low costs for manufacturing the shelter panels, and also to ensure a manufacturing process, which is simple and can be effectively carried out under rudimentary conditions, it is desirable to provide an improved panel design. Accordingly, it is an object of the present invention to achieve such improvements in relation to costs and local manufacturing feasibility.

Accordingly, this object is achieved by a panel for mounting in a building structure, which is simple and easy to manufacture.

This object is achieved by the provision of a panel for a building structure of the initially mentioned kind, wherein the panel comprises at least one mineral wool fibre slab with a plurality of first strips adhered to the outer surface and a plurality of second strips adhered to the inner surface.

The mineral wool fibre slab is formed and kept in the predefined curved shape by fixing the strips to the surfaces as the at least one slab and the strips are glued together in a form and thereby retains the curved shape. The manufacture is simple and suitable for production locally or even on site. The components may be transported to the manufacturing site in stacks of flat elements, which ensures a compact transport unit which is easy and cost-efficient to handle. By using strips the compactness of the components is very advantageous for transport just as using the metal strip to retain the curved shape means that only a small amount of glue or similar adhesive is required. This is advantageous from a cost perspective as the adhesive is a costly component when producing such panel. Preferably, the strips are metal strips, but could be of other suitable materials.

The panels are formed with a predefined curvature, which is preferably formed substantially as half-shells so that two panels may be provided forming an arc and a number of panels are similarly erected adjacent each other to form a building structure in the form of a shelter comprising a plurality of panels. By providing the panels in mineral wool fibre material, preferably stone wool, a thermally insulating panel is provided providing the shelter structure with thermal insulation just as the shelter hereby also attains fire-retarding properties.

The adhesive used for adhering the strips to the slab or slabs may be any kind of glue, such as polyurethane glue or foam, for example SikaBond®-T2i, which is a 1-component polyurethane glue, Casco Nobel Superfix 3890, PU Construction- & Precision Foam 594 (Danalim), Construction Extra 292 (Danalim) or other suitable construction glues or foams.

By the invention, it is found advantageous that the density of the mineral wool fibre layers is within the range of 70 to 180 kg/m$^3$, preferably approx. 90 kg/m$^3$. This provides sufficient strength to the panels as well as the weight of each panel is kept low.

Preferably, the first strips and the second strips are arranged substantially parallel to each other on the convex outer surface and the concave inner surface, respectively. Furthermore, the strips extend on the outer and inner surfaces between the end edges of said end edge regions. Hereby the amount of material is kept at a minimum and at the same time it is ensured that the predefined shape is kept along the entire panel.

Preferably, the strips are metal strips and more preferably made of thin steel sheets and are preferably galvanised in order to prevent corrosion. This also keeps the costs low.

The panel may consist of one single slab, but it is realised that a plurality of mineral wool fibre slabs may be arranged in succession, and such that each metal strip straddles all of the mineral wool fibre slabs.

According to a second aspect of the invention, there is also provided a method of manufacturing a panel for a building structure, as described above, comprising the steps of:
- providing a panel form with a predefined curvature, and placing one or more first strips in the panel form, and then adhesively fixing at least one mineral fibre slab to the first strips by placing the at least one mineral fibre slab in the panel form, and then
- providing a layer of adhesive onto the inner surface of the at least one slab, and then
- placing one or more second strips in the panel form such that said second strips become adhesively fixed to the at least one mineral fibre slab.

This method is advantageous as it is easy and simple to organise and suitable for setting up a production locally with a short notice where the shelters made up by the panels, such as refugee shelters, are needed.

The method preferably further includes the step of providing a counter form with a curvature shape congruently shaped relative to the predefined curvature of the panel form, and positioning said counter form against the innermost surface of the panel, and potentially biasing the counter form against the panel form to clamp the first and second strips and the slab in the form while the adhesive is curing.

In a first embodiment, the panel form is a negative form with a predefined concave curvature. Alternatively, the panel form may be a positive form with a predefined convex curvature.

BRIEF DESCRIPTION OF THE DRAWINGS

In the following the invention is described in more detail with reference to the accompanying drawings, in which.

DETAILED DESCRIPTION OF THE INVENTION

Figure 1:
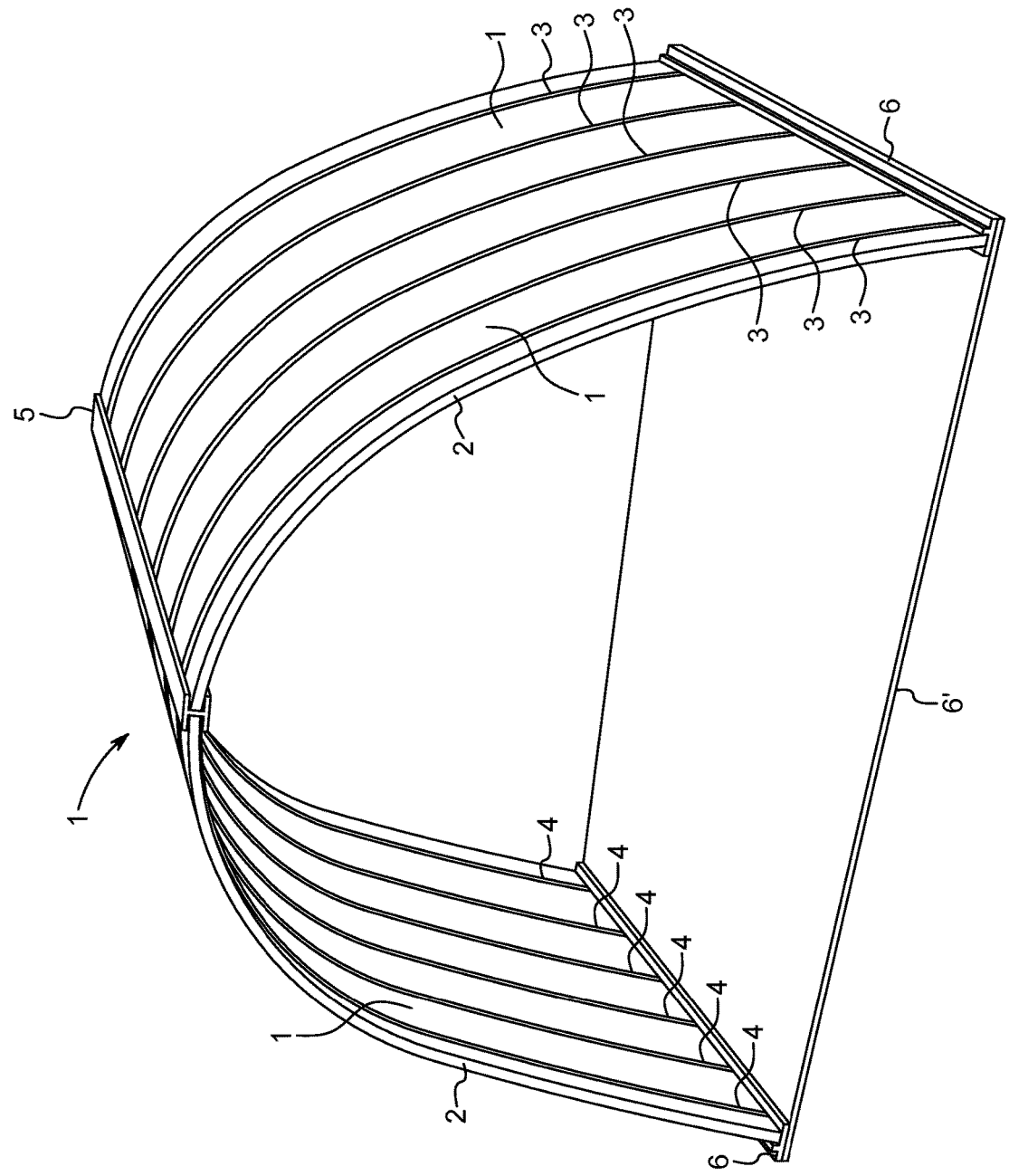
FIG. 1 is a schematic perspective view of a shelter formed by panels according to an embodiment of the present invention.
Figure 2:
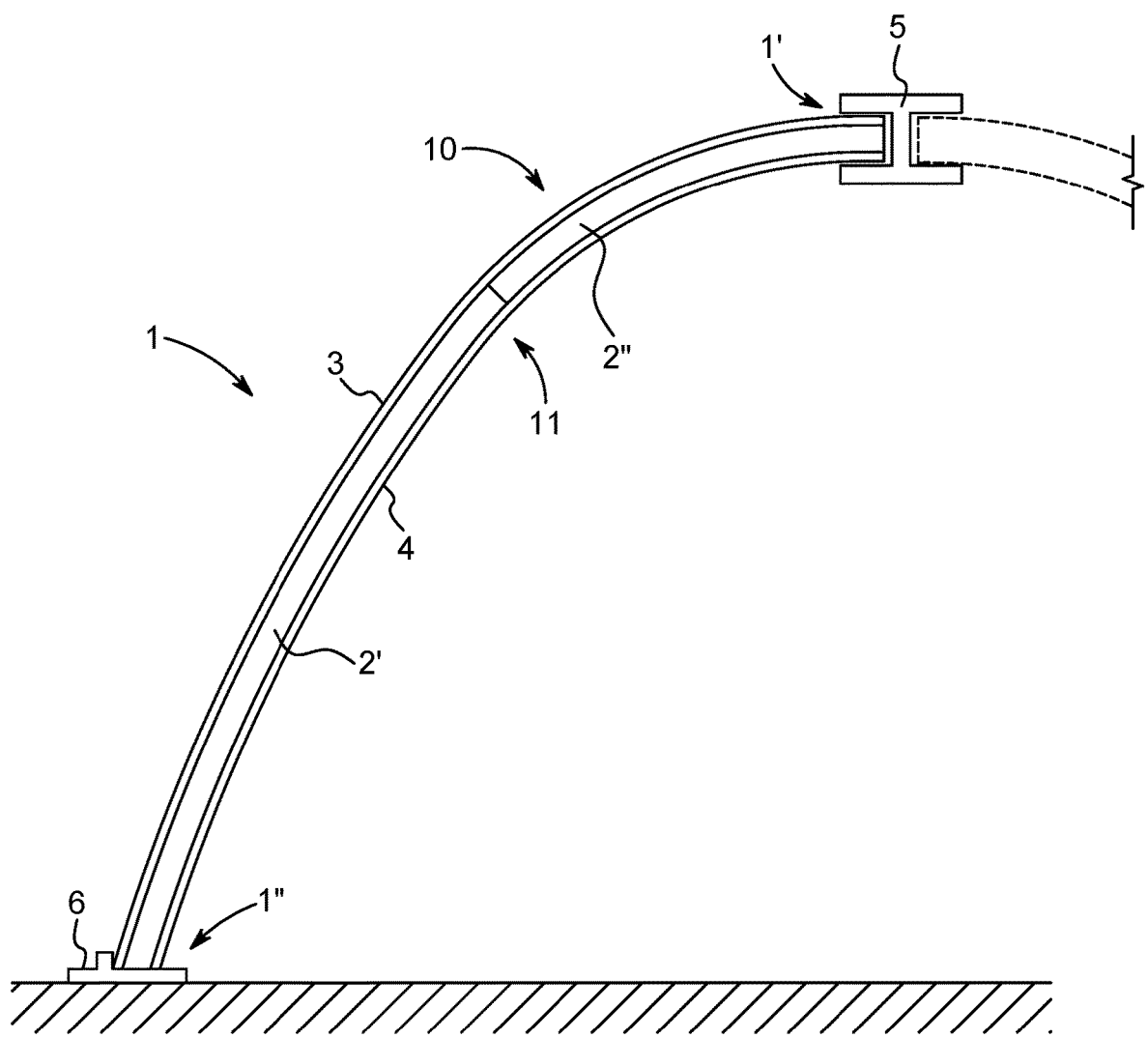
FIG. 2 is a schematic side view of a panel according to the invention positioned in a shelter building structure.

With reference to FIG. 1, an embodiment of a temporary building structure, such as a shelter, is shown. In the depicted example the shelter is made of four panels 1, where each panel 1 is formed as a half-shell so that two panels 1 may be provided forming an arc and in the example shown in FIG. 1 two arcs of panels 1 are provided are adjacent each other to form the building structure. The panels 1 are assembled in the top at a top profile 5, such as an I-profile as shown in FIGS. 1 and 2. At the ground level the panels 1 are supported and kept in position by ground retain profiles 6 that may be provided as part of a base frame 6' for the shelter.

Figure 3:
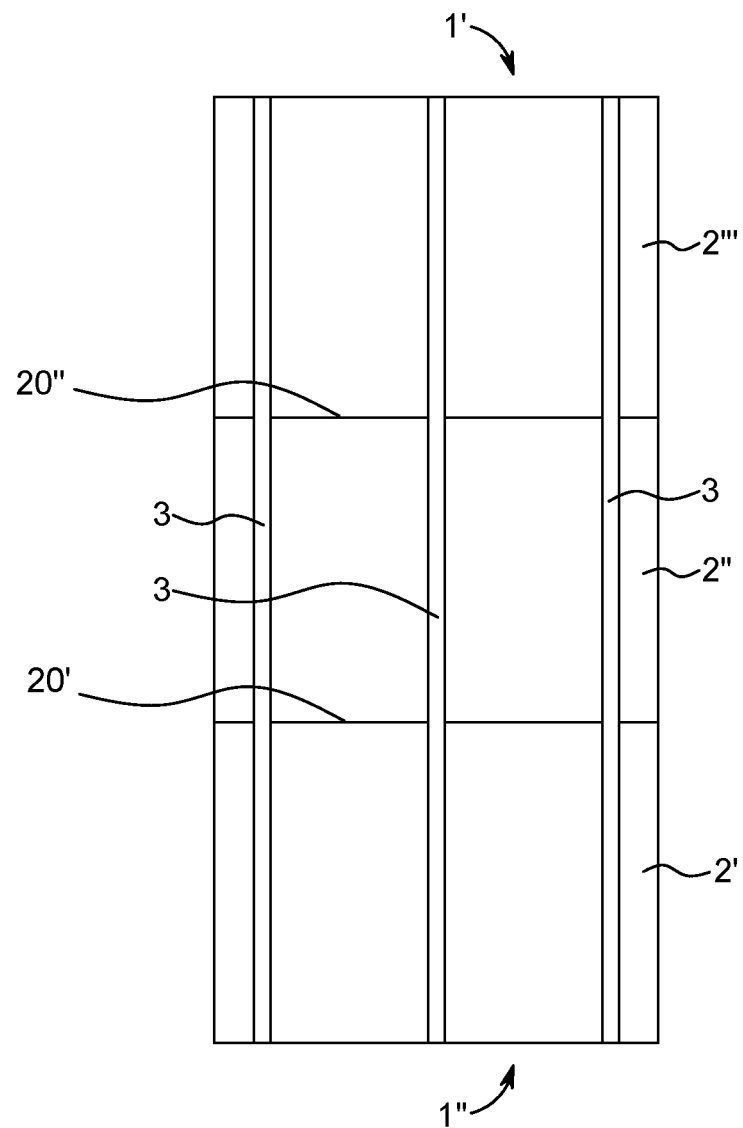
FIG. 3 is a schematic front view of same.
Figure 4:
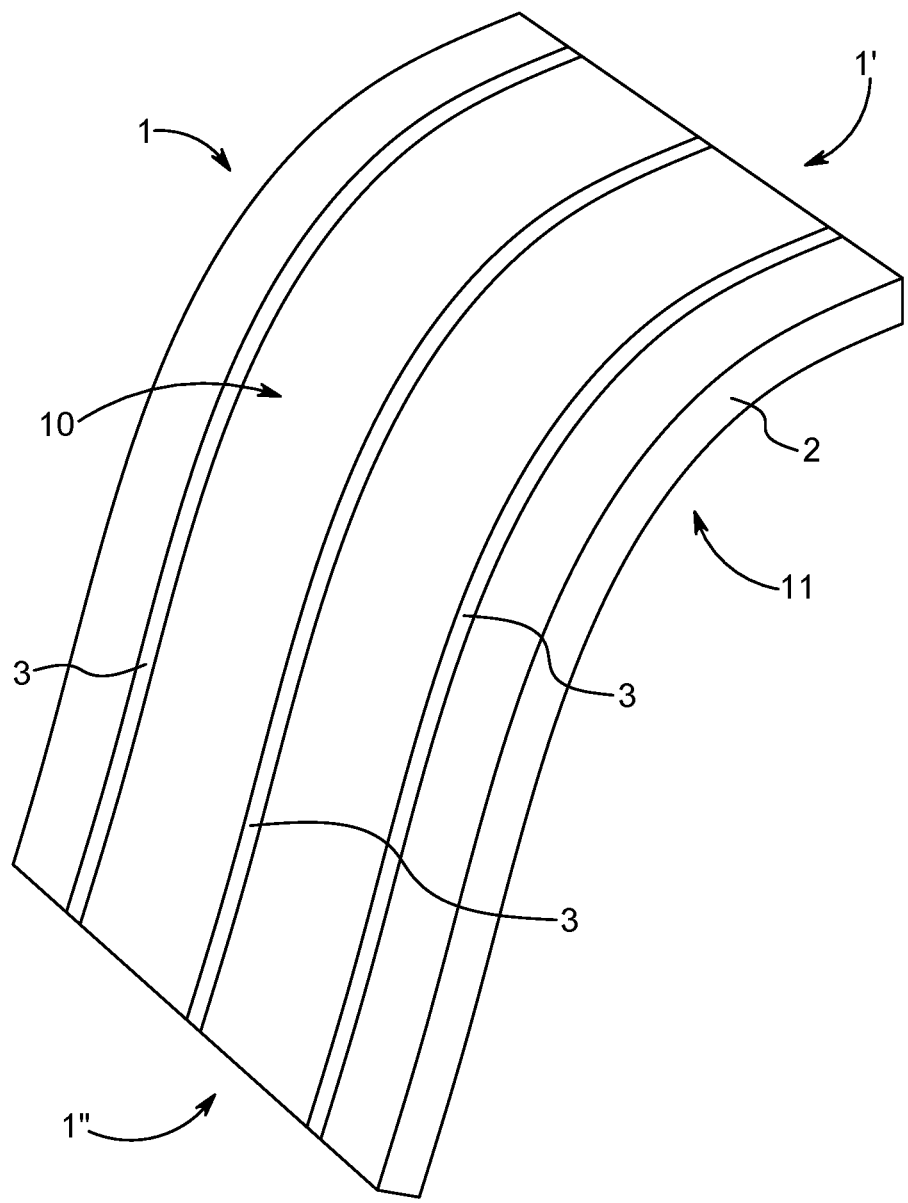
FIG. 4 is a schematic perspective view of the panel.

With reference to FIGS. 2, 3 and 4, where an individual panel 1 is shown, it is apparent that the panel 1 has a generally rectangular shape with a curvature, such that the panel has a convex outer surface 10 and a concave inner surface 11 with a set of side edge regions and a set of end edge regions 1', 1".

As shown in FIG. 1 and in FIGS. 2 to 4, the panels 1 are provided with first metal strips 3 on the outside surface of the panels 1, i.e. the convex side, and with a second set of metal strips 4 on the inner side, i.e. the concave side. In the figures three metal strips 3, 4 are provided on the outside and on the inside surface of each panel 1, however, it is realised that depending on size of the panels 1 this number may vary.

The metal strips 3, 4, such as three on each size, are made of thin steel sheets and having a size of e.g. 0.7×20×3000 mm. The metal strips are preferably galvanised to ensure they are resistant to corrosion. Accordingly, the panel may have the dimensions of 3000×600 mm.

Figure 5:
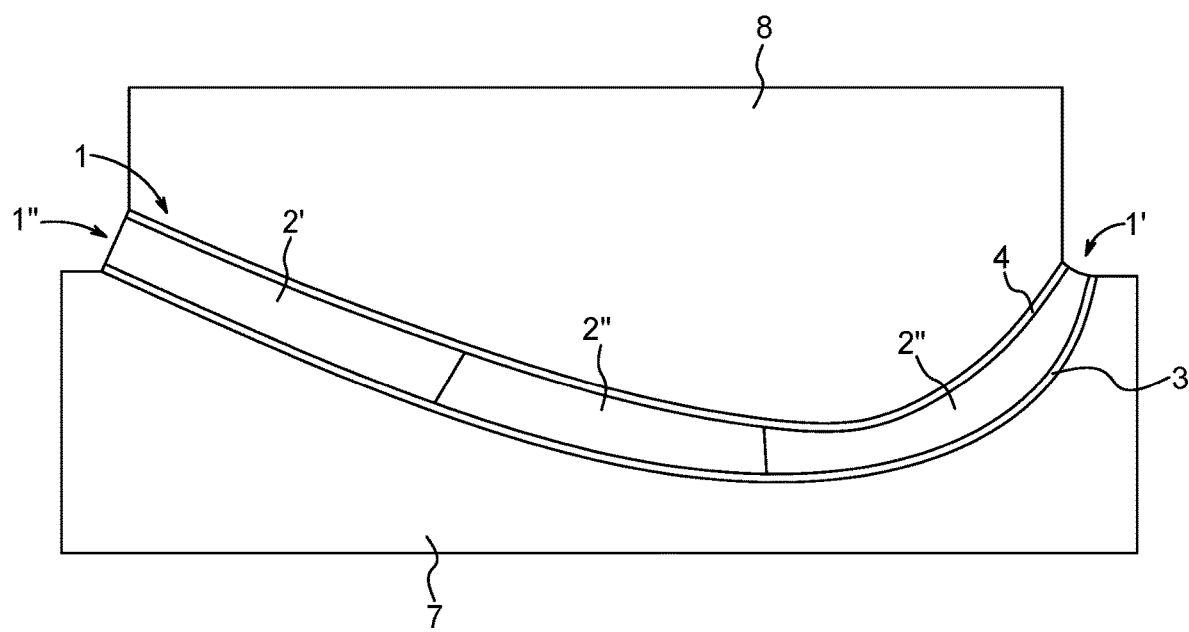
FIG. 5 is a schematic side view of a production form with a panel according to the invention therein.

The resulting panel 1 is manufactured of a mineral wool fibre slab 2 (see FIG. 4) or a plurality of slabs 2', 2", 2'" (two in FIG. 2 and three slabs in FIGS. 3 and 5). The slab 2 (or slabs 2', 2", 2'") are positioned and formed in a negative form part 7 (see FIG. 5) after the first set of metal strips 3 are positioned in the form 7 and adhesive is applied to the side of the metal strips 3 facing the slabs 2. Seams 20', 20" (see FIG. 4) are exposed between the adjacent ones of the slabs 2.

The second set of metal strips 4 is then adhesively applied on the concave surface of the slab 2 (or slabs 2', 2", 2'"), and a positive second form part 8 may then be provided to ensure that the panel 1 retains the curved form during the curing of the adhesive. The adhesive used may be any kind of glue suitable for bonding mineral wool fibre materials, such as polyurethane glue or foam, for example SikaBond®-T2i, which is a 1-component polyurethane glue, Casco Nobel Superfix 3890, PU Construction- & Precision Foam 594 (Danalim), Construction Extra 292 (Danalim) or other suitable construction glues or foams.

The form part 7, 8 is provided with a predefined curvature, which is essentially formed as half-shells so that two panels may be provided forming an arc and a number of panels are similarly erected adjacent each other to form a building structure in the form of a shelter comprising a plurality of panels (such as shown in FIG. 1).

One of the form parts 7, 8 may include an opposite form part on the other side to enable a stack of panels to be made. This can save floor space at the manufacturing site, which may be important especially when working with glues requiring substantial drying or curing time.

The slabs 2 are made of mineral wool fibre material, preferably stone wool. This ensures a thermally insulating panel for the shelter structure as well as good fire-retarding properties. The density of the layers is preferably within the range of 70-180 kg/m$^3$, preferably approx. 90 kg/m$^3$. Hereby, the sufficient strength and rigidity of the panel is achieved whilst the weight of the panel is kept low. To ensure a relatively low weight whilst also ensuring acceptable thermal insulation properties, the thickness of the mineral wool fibre slab is preferably 25-50 mm, but could be up to 100 mm.

As the panels 1 are assembled in an arc-like structure in the shelter, the panels 1 will be subjected to compression forces at their inner sides and potentially even tension forces on the outside surface. The metal strips 3, 4 ensure the form stability of the panels 1 when subjected to such forces.

The method of manufacturing the panel 1 comprises the steps of placing the first metal strips in the panel form with adhesive thereon and the placing a slab making up the first layer 1 in the negative form 7 with a predefined concave curvature. Thereafter, the second metal strips are adhesively provided in the panel form such that said second metal strips become adhesively fixed to the at least one mineral fibre slab.

A positive counter form part 8 with a convex shape congruently shaped relative to the predefined concave inner curvature of the negative form part 7 may then be positioned abutting the concave innermost surface 11 of the panel, and potentially biasing the counter form part 8 against the negative form part 7 to clamp the first and second metal strips 3, 4 to the slabs 2 in the form while the adhesive is curing.

Above, the present invention is described with reference to some currently preferred embodiments. However, it is by the invention realised that variants to the embodiments may be made without departing from the scope of the invention as defined in the accompanying claims, for instance, the strips are above referred to as metal strips, but could be made of other suitable materials at hand, such as plastics, wood or the like.

The invention claimed is:

1. A panel for a building structure, comprising:
 a panel having a predefined curvature, the panel having a generally rectangular shape with a curvature, such that the panel has a convex outer surface and a concave inner surface with a set of side edge regions and a set of end edge regions;
 the panel comprising at least one mineral wool fibre slab with a plurality of first strips adhered to the outer surface and a plurality of second strips adhered to the inner surface,
 wherein the panel consists of:
  the at least one mineral wool fibre slab having a density within the range of 70 to 180 kg/m3,
  the plurality of first strips and the plurality of second strips extending in a longitudinal direction of the panel from one of the set of end edge regions to the other one of the set of end edge regions, and
  an adhesive provided such that the plurality of first strips are adhered to the outer surface of the mineral wool fibre slab and the plurality of second strips are adhered to the inner surface of the mineral wool fibre slab, and
 wherein the panel extending vertically between the set of end edge regions has a middle portion between the set of end edge regions and wherein the mineral wool fibre slab is exposed at the middle portion between the first strips to an exterior of the building structure and the mineral wool fiber slab is exposed at the middle portion between the second strips to an interior of the building structure.

2. The panel according to claim 1, wherein the mineral wool slab has a density of approx. 90 kg/m3.

3. The panel according to claim 1, wherein the first strips and the second strips are arranged substantially parallel to each other on the convex outer surface and the concave inner surface, respectively.

4. The panel according to claim 1, wherein the strips each extends on the respective outer and inner surfaces between end edges of the end edge regions.

5. The panel according to claim 1, wherein the strips are metal strips.

6. The panel according to claim 5, wherein the metal strips are made of thin steel sheets.

7. The panel according to claim 5, wherein the metal strips are galvanised.

8. The panel according to claim 1, wherein the at least one mineral wool fibre slab comprises a plurality of mineral wool fibre slabs provided in succession, and each strip straddles all of the mineral wool fibre slabs.

9. The panel according to claim 1, wherein the panel is provided with a predefined curvature, which is essentially a half-span of a building structure.

10. A building structure comprising a plurality of panels according to claim 1.

11. A method of manufacturing a panel for a building structure according to claim 1, comprising the steps of:
 providing a panel form with a predefined curvature; and
 placing one or more of the plurality of first strips in the panel form; and then
 adhesively fixing the at least one mineral fibre slab to the one or more of the plurality of first strips by placing the at least one mineral fibre slab in the panel form; and then
 providing a layer of adhesive onto the inner surface of the at least one mineral fibre slab; and then
 placing one or more of the plurality of second strips in the panel form such that the one or more of the plurality of second strips become adhesively fixed to the at least one mineral fibre slab.

12. The method according to claim 11, further comprising:
 providing a counter form with a curvature shape congruently shaped relative to the predefined curvature of the panel form; and
 positioning the counter form against the innermost surface of the panel.

13. The method according to claim 12, further comprising biasing the counter form against the panel form to clamp the first and second strips against the at least one mineral wool fibre slab while the adhesive is curing.

14. The method according to claim 12, wherein the panel form is a negative form with a predefined concave curvature.

15. The method according to claim 12, wherein the panel form is a positive form with a predefined convex curvature.

16. The panel according to claim 1, wherein the first strips are adhered directly to the outer surface of the at least one mineral wool fibre slab, and the second strips are adhered directly to the inner surface of the at least one mineral wool fibre slab.

17. The panel according to claim 1, wherein:
 each of the first strips is spaced apart from each other on the outer surface and adhered to the at least one mineral wool fibre slab without horizontal connections between the first strips on the outer surface in the middle portion of the panel; and
 each of the second strips is spaced apart from each other on the inner surface and adhered to the at least one mineral wool fibre slab without horizontal connections between the second strips on the inner surface in the middle portion of the panel.

18. The panel according to claim 1, wherein a seam between the adjacent ones of a plurality of mineral wool fibre slabs is exposed on the outer surface between the first strips, and the seam is exposed on the inner surface between the second strips.

19. The panel according to claim 16, wherein:
 each of the first strips is spaced apart from each other on the outer surface and adhered to the at least one mineral wool fibre slab without horizontal connections between the first strips on the outer surface in the middle portion of the panel; and
 each of the second strips is spaced apart from each other on the inner surface and adhered to the at least one mineral wool fibre slab without horizontal connections between the second strips on the inner surface in the middle portion of the panel.

20. The panel according to claim 16, wherein a seam between adjacent ones of a plurality of mineral wool fibre slabs is exposed on the outer surface of mineral wool fibre slabs between the first strips, and the seam is exposed on the inner surface between the second strips.

21. The panel according to claim 17, wherein one of the end edge regions is a ground level end edge region and the other of the end edge regions is a building top end edge region.

22. A panel for a building structure, comprising:
a panel having a predefined curvature, the panel having a generally rectangular shape with a curvature, such that the panel has a convex outer surface and a concave inner surface with a set of side edge regions and a set of end edge regions;
the panel comprising at least one mineral wool fibre slab with a plurality of first strips adhered to the outer surface and a plurality of second strips adhered to the inner surface,
wherein the panel consists of:
the at least one mineral wool fibre slab having a density within the range of 70 to 180 kg/m3,
the plurality of first strips and the plurality of second strips extending in a longitudinal direction of the panel from one of the set of end edge regions to the other one of the set of end edge regions, and
an adhesive provided such that the plurality of first strips are adhered to the outer surface of the mineral wool fibre slab and the plurality of second strips are adhered to the inner surface of the mineral wool fibre slab,
wherein a seam between the adjacent ones of a plurality of mineral wool fibre slabs is exposed on the outer surface between the first strips, and the seam is exposed on the inner surface between the second strips.

\* \* \* \* \*